May 19, 1964
R. J. MEIJER
3,133,477
SELF LUBRICATING PISTON
Filed Nov. 10, 1961
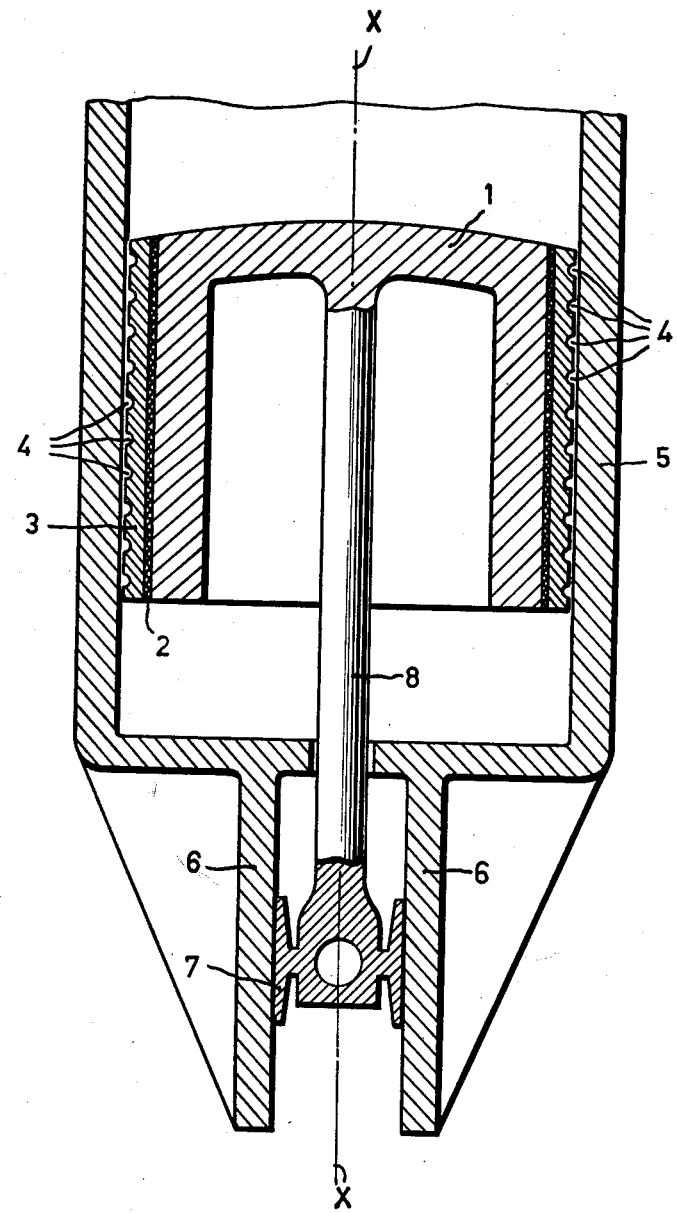
INVENTOR
ROELF J. MEIJER.
BY
AGENT 3,133,477
SELF LUBRICATING PISTON
Roelf Jan Meijer, Emmasingel, Eindhoven, Netherlands, assignor to North American Philips Company, Inc., New York, N.Y., a corporation of Delaware
Filed Nov. 10, 1961, Ser. No. 151,569
Claims priority, application Netherlands Dec. 3, 1960
8 Claims. (Cl. 92—155)

The invention relates to a combination of a body having a cylindrical inner surface with a body movable therein having a cylindrical outer surface, such as, for example, a cylinder and a piston. Outside the body having a cylindrical inner surface, the body having a cylindrical outer surface is provided with straight line guiding.

In ths kind of combination, it is known to provide the movable body with a layer of a material having satisfactory running properties, such as, for example, a thin layer of tin. As a result, the running properties are improved. In hydraulic arrangements, it is possible to use the movable member provided with such a layer of material having satisfactory running properties in the combination without the use of further sealing means. In arrangements in which high temperatures occur, the movable body provided with such a layer of material cannot be used without special precautions to ensure satisfactory sealing. Owing to the uneven expansion of the piston and the wall of the cylinder, it is not possible to maintain a very narrow gap between these two bodies. For sealing purposes, the movable body must be provided, for example, with piston rings.

This known embodiment of the movable body has a further limitation in that the running properties of the layer of material applied are not such that lubrication may be omitted.

In order to mitigate the said disadvantages, the combination in accordance with the invention is characterized in that the body having a cylindrical outer surface and running without the use of a lubricant is movable substantially without clearance in the body having a cylindrical inner surface. The outer surface of the body having a cylindrical outer surface is then provided with a layer consisting of a mixture of white metal and molybdenum- or tungsten-disuphide applied by spraying.

White metal is to be understood to mean here a tin- or lead-base alloy containing a few percent by weight of antimony and copper. In itself, this white metal already has excellent running properties which in this case are improved by the addition of molybdenum- or tungsten-disulphide during the spraying process. Owing to their graphite like qualities, molybdenum- and tungsten-disulphide have satisfactory lubricating properties. By the addition of molybdenum- or tungsten-disulphide, the white metal has become self-lubricating. Consequently, it is not necessary for an additional lubricant to be supplied between the movable body and the wall of the cylinder.

As a result of the excellent running properties of the layer of material in accordance with the invention, it is possible for the body having a cylindrical outer surface to be included in the body having a cylindrical inner surface substantially without clearance. Since in this case the two bodies are in contact with each other substantially throughout their circumferences, the thermal resistance between these two bodies will be very low. Consequently, the two bodies will have substantially the same temperature, so that the chance of seizure of the movable body and the body having a cylindrical inner surface surrounding it is substantially negligible. Since the movable body runs substantially without clearance in the body having a cylindrical inner surface, a satisfactory seal is obtained without the use of special sealing means, which seal is sufficient both for liquids and for gaseous fluids.

The layer of material having satisfactory running properties is applied by spraying, since in a liquid state separation of the mixture of white metal and molybdenum or tungsten disulphide occurs. Thus, the white metal and molybdenum or tungsten disulphide is pulverized and mixed as a fine powder. The fine powder is then inserted in a spraying flame. The powdered particles do not melt completely permitting the powdered articles to stick to the piston surface as well as to each other. The coating has the structure of sintered metal and the molybdenum disulphide is subdivided to result in good self lubrication for a long period of time.

An advantageous embodiment of the combination in accordance with the invention is characterized in that the mixture consisting of white metal and molybdenum- or tungsten-disulphide contains at most 5 percent by weight of molybdenum- or tungsten-disulphide.

A further advantageous embodiment of the combination in accordance with the invention is characterized in that the layer applied by spraying has a thickness of at the most 5 mms. This thin layer of material is sufficient to give satisfactory running properties to the movable body, while, when the movable body becomes defective, this layer at the same time protects the inner surface of the body having a cylindrical inner surface from being attacked.

An advantageous embodiment of the combination in accordance with the invention is further characterized in that the layer applied by spraying is provided with grooves extending in a circular form about the center line of the combination. These grooves enable a slightly oversized movable body to be inserted in the body having a cylindrical inner surface. During operation of the combination, the excessive material is then pressed into the grooves to a slight extent. These grooves may also serve to take up any impurities present between the moving surfaces.

The combination in accordance with the invention is particularly suitable for use in a hot-gas reciprocating apparatus which includes a cylinder comprising a piston and a displacer movable therein.

A hot-gas recprocating apparatus is understood to mean a hot-gas reciprocating engine, a gas refrigerator and a heat pump operating according to the reversed hot-gas reciprocating engine principle. In these apparatuses, the working fluid is compelled to flow through a regenerator from a colder space towards a warmer space, and conversely, by the piston and displacer which run with a certain phase difference. In this case, it is of great importance for the fluid to remain free of residual lubricating oil to prevent the regenerator from becoming dirty, and this may be realized satisfactorily with a combination in accordance with the invention, in which no additional lubricant is present between the contact surfaces. Apart from this advantage, the great simplicity of this construction plays an important part.

The invention will now be described more fully with reference to the drawing.

The figure shows diagrammatically and not to scale an axial section of a piston-shaped body provided with a layer of a material having satisfactory running properties. In this figure, reference numeral 1 denotes the piston body. A layer of tin 2 is applied to the cylindrical outer surface of the piston-shaped body 1. On the layer of tin 2, a layer 3 consisting of a mixture of white metal and molybdenum disulphide is applied by spraying. The layer of tin 2 serves to ensure a satisfactory adhesion between the layer 3 applied by spraying and the piston body 1 which preferably consists of cast iron. The thickness of the layer of tin 2 is very small, for example 0.1 mm. In the layer of material 3, shallow grooves 4 are provide which extend in substantially circular form around the axis X—X of the piston. The piston is housed in the cylinder 5, to the lower end of which are connected guide member 6. A cross-head 7, which is connected to a piston rod 8, slides between these guides. Consequently, no lateral forces can be exerted on the piston body.

When use is made of this combination of a piston and a cylinder in a hot-gas engine, the piston is made slightly oversize. The piston is then introduced by cooling it, so that it shrinks slightly and may readily be inserted into the cylinder. During running-in, the material of the contact surface will be pressed into the grooves 4 to a slight extent.

When use is made of this combination in a gas refrigerator, it is sufficient to dimension the piston as accurately as possible. As a result of the low temperatures occurring during operation of this engine, the piston and the cylinder wall hardly expand, so that a satisfactory seal is obtained by accurate dimensioning of the piston.

What is claimed is:

1. A combination of a cylinder with a piston adapted for reciprocation therein and having a straight line guiding means for said piston comprising: said cylinder and piston having interfitting surfaces substantially without clearance, the outer surface of said piston being provided with a self lubricating means constituting a layer affixed thereon of a mixture of pulverized and sprayed white metal and molybdenum disulphide.

2. A combination of a cylinder with a piston adapted for reciprocation therein and having a straight line guiding means for said piston comprising: said cylinder and piston having interfitting surfaces substantially without clearance, the outer surface of said piston being provided with a self lubricating means constituting a layer affixed thereon of a mixture of pulverized and sprayed white metal and tungsten disulphide.

3. A combination of a cylinder with a piston adapted for reciprocation therein as claimed in claim 1 wherein said sprayed layer has a thickness of at most 5 mms.

4. A combination of a cylinder with a piston adapted for reciprocation therein and having a straight line guiding means for said piston comprising: said cylinder and piston having interfitting surfaces substantially without clearance, the outer surface of said piston being provided with a self lubricating means constituting a layer affixed thereon of a mixture of pulverized and sprayed white metal and molybdenum disulphite, said layer being provided with a plurality of grooves extending annularly about the center line of said piston.

5. A piston of the type used in a hot gas reciprocating apparatus comprising a layer formed on the outer surface thereof constituted of a sprayed mxture of white metal and molybdenum disulphide.

6. A piston of the type used in a hot gas reciprocating apparatus comprising a layer formed on the outer surface thereof constituted of a sprayed mixture of white metal and tungsten disulphide.

7. A piston as claimed in claim 5 wheren said molybdenum disulphide has a thickness of at most 5 mms.

8. A piston as claimed in claim 5 wherein acid layer is provided with a plurality of annular grooves extending circumferentially around said piston.

References Cited in the file of this patent

UNITED STATES PATENTS

| | | |
|---|---|---|
| 1,549,486 | Hall | Aug. 11, 1925 |
| 1,947,493 | Rose et al. | Feb. 20, 1934 |
| 2,244,954 | Lenz et al. | June 10, 1941 |
| 2,983,564 | McLean et al. | May 9, 1961 |

FOREIGN PATENTS

| | | |
|---|---|---|
| 784,165 | Great Britain | Oct. 2, 1952 |

UNITED STATES PATENT OFFICE
CERTIFICATE OF CORRECTION

Patent No. 3,133,477 May 19, 1964

Roelf Jan Meijer

It is hereby certified that error appears in the above numbered patent requiring correction and that the said Letters Patent should read as corrected below.

Column 4, line 22, for "wheren" read -- wherein --; line 24, for "acid" read -- said --.

Signed and sealed this 22nd day of September 1964.

(SEAL)
Attest:

ERNEST W. SWIDER
Attesting Officer

EDWARD J. BRENNER
Commissioner of Patents